United States Patent [19]
Fujita et al.

[11] Patent Number: 5,111,033
[45] Date of Patent: May 5, 1992

[54] OPTICAL CARD

[75] Inventors: Minoru Fujita; Yuji Kakinuma; Yoichi Fukushima, all of Tokyo, Japan

[73] Assignee: Kyodo Printing Co., Ltd., Tokyo, Japan

[21] Appl. No.: 759,110

[22] Filed: Sep. 6, 1991

Related U.S. Application Data

[63] Continuation of Ser. No. 424,896, Oct. 20, 1989, abandoned.

Foreign Application Priority Data

Nov. 10, 1988 [JP] Japan .................. 63-284362
Mar. 27, 1989 [JP] Japan .................. 1-74448

[51] Int. Cl.$^5$ .............................. G06K 14/02
[52] U.S. Cl. ........................... 235/488; 235/468; 235/487; 235/491
[58] Field of Search ............... 235/468, 487, 488, 491

[56] References Cited

U.S. PATENT DOCUMENTS 3,829,662 8/1974 Furahashi .................. 235/468
4,694,148 9/1987 Diekemper ................. 235/468
4,831,244 5/1989 Slafer et al. ............... 235/491

Primary Examiner—Harold Pitts
Attorney, Agent, or Firm—Kane, Dalsimer, Sullivan, Kurucz, Levy, Eisele and Richard

[57] ABSTRACT

In an optical card, a card substrate has its rigidity which is sufficient to handle the card substrate independently. The card substrate has a first side which serves as a reading side upon which reading light is incident. An optical-data recording section includes a light-reflective pattern. The optical-data recording section is arranged on one of the first and second sides of the card substrate. Optical data incident upon the optical-data recording section toward the reading side of the card substrate is recorded by the optical-data recording section. A shielding layer is arranged on one of the first and second sides of the card substrate, for shielding the optical-data recording section from a viewer's field of view. The shielding layer has its transmission characteristic with respect to the reading light, which is sufficient to shield light within a visual range and to enable reading of the optical-data recording section.

9 Claims, 3 Drawing Sheets

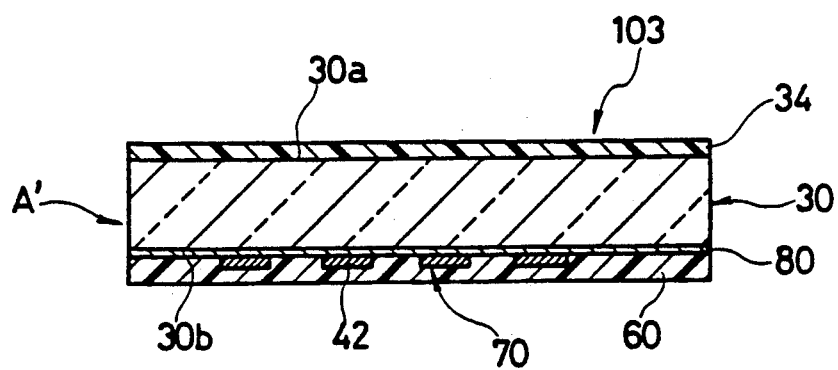
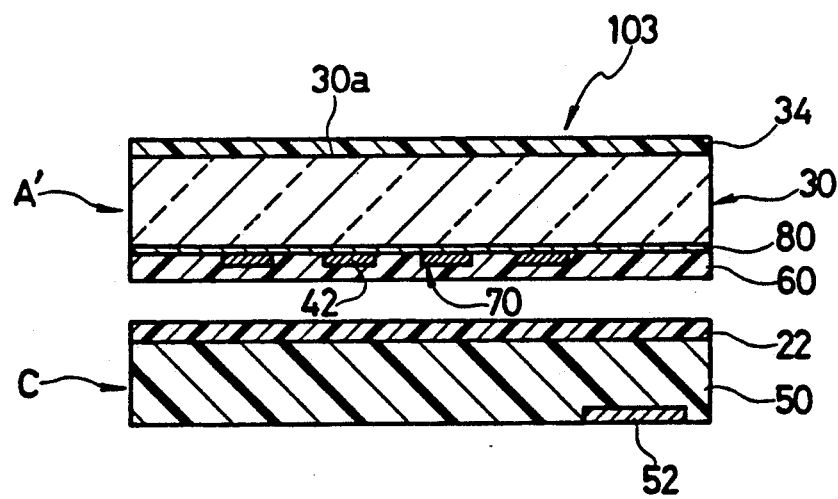

OPTICAL CARD

This is a continuation of copending application Ser. No. 07/424,896 filed on Oct. 20, 1989 now abandoned.

BACKGROUND OF THE INVENTION

The present invention relates to optical cards in which information recorded on the optical cards is optically read and, more particularly, to a card technique which makes difficult identification, in external appearance of an optical card from other cards such as magnetic cards. IC (integrated circuit) cards and the like.

In recent years, utilization of cards increases abruptly. In response to the increase in the cards, types or kinds of the cards also increase. The main current is a magnetic stripe card, that is, a magnetic card, with exception of the above, attention is made to an IC card having a larger storage capacity and a higher security function and an optical-data recording card, that is, an optical card having a storage capacity which is larger a few hundred times than the IC card.

These various cards are common to each other in that a data recording section is provided on a card substrate which has its rigidity as the card. Each of the magnetic stripes of the magnetic card and the memory in the IC of the IC card forms the data recording section. Further, in the optical card, the optical-data recording pattern, which is made of material high in light reflectivity, forms an optical-data recording section. Accordingly, from a difference of the optical data recording section or other sections, it is easy to identity the type or kind of the cards by observation of the external appearance of the cards. Particularly, in the optical cards, that is, in the read-only optical card there among, a portion of the optical card has light reflectivity which is extremely high. For this reason, it can easily be understood that a glance at the card shows an optical card.

By the way, in order to prevent the card from being formed or being abused, it is desired that cards different in type from each other are difficult to be identified on external appearance. This also has a sense from the viewpoint of increasing a commodity value.

From the points of view referred to above, in the conventional optical card, identification of the card can easily be grasped by observation of the external appearance of the card, since the optical-data recording section can be viewed from the reading side, The optical-data recording section cannot originally be viewed from a side of the optical card, which is opposite to a side thereof upon which the reading light is incident.

As a technique which makes the types of the cards difficult to understand, a way is considered in which the recording section is concealed. Regarding a magnetic card, U.S. Pat. No. 4,182,350 discloses a technique in which a color layer is provided just on a magnetic stripe that is a recording section, to conceal the color peculiar to the magnetic stripe, thereby increasing a sense of beauty.

If, however, an optical-data recording section of an optical card is concealed simply by the color layer disclosed in the above-mentioned U.S. Pat. No. 4,132,350, that is, by a shielding layer, the shielding layer will interfere with reading of the optical-data recording section. Particularly, if the shielding layer is provided adjacent the optical-data recording section, a delicate change will be given to a viewer in the viewpoint of external appearance by reception of an influence of variation in the shielding layer or an influence of a light-reflective pattern of the optical data recording section. That is, a delicate change is given to light reflected from the optical card. By the change, the viewer knows what is present below the shielding layer. This is considered as follows, That is, in case of the magnetic stripes, the entire stripes are formed by a layer which is substantially even or uniform in thickness, while the optical-data recording section of the optical card has irregularity because the light-reflective pattern indicating the information is formed in the optical-data recording section of the optical card. That is, in the optical card, at any cost, delicate irregularity will remain on the surface of the layer of the optical card, or interference of the light will occur by influence of the light-reflective pattern. In case of the optical card, accordingly, the shielding layer cannot but be formed thick considerably so as to eliminate the irregularity. If the shielding layer is thick, however, the uniformity in thickness of the entire shielding layer tends to be damaged and, accordingly, there is a fear that a problem occurs in reading of the optical card.

As the optical card. Japanese Pat. Provisional Publication (Kokai) No. SHO 02-298036 discloses such a technique that a light-colored coloring layer is provided adjacent the optical-data recording section, that is, just on the latter, thereby increasing advantages of design. However, this technique can be said to a technique in which a metallic color of the optical-data recording section can be viewed through the coloring layer. Thus, a viewer can easily identify that the card is an optical card.

SUMMARY OF THE INVENTION

It is an object of the invention to provide an optical card in which it is difficult to identity type of the card by vision or view.

It is another object of the invention to provide a technique in which it can easily be inspected whether or not elements for making identification of type of the card difficult are good or bad.

It is still another object of the invention to provide a technique capable of effectively concealing an optical-data recording section of an optical card without any interference with reading of the optical data recording section.

It is a further object of the invention to provide a technique capable of effectively concealing an optical-data recording section of an optical card without any thickening of the optical card.

According to the invention, there is provided an optical card comprising:

a card substrate having a first and a second sides which are parallel to each other, the card substrate having its rigidity which is sufficient to handle the card substrate independently, the first side of the card substrate serving as a reading side upon which reading light is incident:

an optical-data recording section including a light-reflective pattern, the optical-data recording section being arranged on one of the first and second sides of the card substrate, in which optical data incident upon the optical-data recording section toward the reading side of the card substrate is recorded by the optical-data recording section; and a shielding layer arranged on one of the first and second sides of the card substrate, for shielding the optical-data recording section from a viewer's field of view, the shielding layer having its transmission characteristic with respect to the reading light, which is sufficient to shield light within a visual range and to enable reading of the optical-data recording section.

Because of the shielding layer, a viewer, which views the optical card, does not understand the presence of the light-reflective pattern of the optical-data recording section, and cannot immediately identify the card as being an optical card. Since, however, the shielding layer allows or permits the reading light, for example, light within a infrared range to be transmitted through the shielding layer, no inconvenience occurs in reading and writing of the data.

Particularly, in the invention, the shielding layer is provided on the card substrate which has its rigidity enabling the card substrate to be handled independently. Accordingly, inspection of the shielding layer, for example, inspection on a light-shielding characteristic within a visible range and a transmission characteristic of the reading light, can easily be checked at the stage of the card substrate which is a component of the optical card.

BRIEF DESCRIPTION OF THE DRAWINGS

FIG. 3A is a cross-sectional view of an optical card having a single-layer construction, according to a third another embodiment of the invention;

FIG. 3B is a view similar to FIG. 3A, but showing a modification of the optical card illustrated in FIG. 3A, which additionally includes a rear substrate;

DETAILED DESCRIPTION

The invention will be described below, by way of mere examples, with reference to the drawings.

First Embodiment

Figure 1:
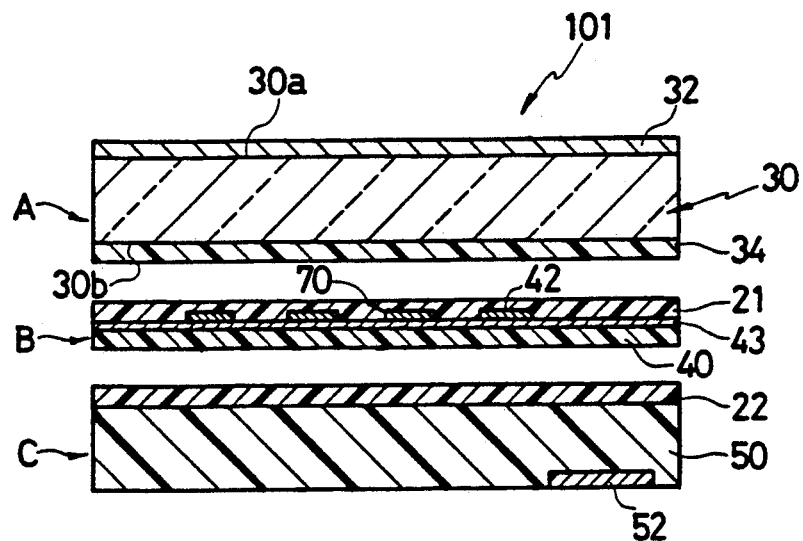
FIG. 1 is a cross-sectional view of an optical card having a three-layer construction, according to a first embodiment of the invention.

Referring to FIG. 1, there is shown a read-only optical card, generally designated by the reference numeral 101, according to a first embodiment of the invention. The optical card 101 is of a three-layer construction which comprises three components A, B and C. For convenience, the three components A, B and C are illustrated in the form separated from each other, but, in fact, the optical card 101 is of construction in which these components A, B and C are put and laminated on each other through respective adhesive layers 21 and 22. The adhesive layers 21 and 22 are made of thermoplastic adhesives, and have their thickness of the order of a few micrometers, which is extremely thin as compared with thickness of other components subsequently to be described.

It is possible to inspect, take charge of, and so on, the three components A, B and C independently. Accordingly, stock of these components makes it possible to respond to small lots of many kinds or many orders.

The component A is mainly composed of a transparent protective substrate or a transparent card substrate 30. The card substrate 30 has a first side 30a and a second side 30b which are smooth in surface roughness. The card substrate 30 has its thickness which is of the order of 800 μm~400 μm, for example. The card substrate 30 also has its rigidity which is sufficient to handle the card substrate 30 independently. Accordingly, various materials or substrates can be used for the card substrate 30. Particularly, materials and substrates are preferable which are high in physical property, superior to transparency and smoothness of their surface roughness. small in deformation with respect to heat, and superior to etching resistance properties. For instance, the following various resins can be used for the card substrate 30. That is, the resins include polycarbonate, acrylic, epoxy, polyethylene terephthalate, polymethyl methacrylate, polysulfone, polyether sulfone, polyether ketone, polyether ether ketone, polyamide, polyimide, and the like.

The card substrate 30 has its first side 30a which serves as a reading side upon which reading light is incident for reading. To this end, the first side 30a has its surface which is coated with a thin hardcoat layer 32 to prevent occurring of imperfections or contamination of dirt or stains. Further, the card substrate 30 has its second side 30b which is parallel to the first side 30a. A shielding layer S4 is formed on the second side 30b to make the internal component B difficult in view or vision from the reading side. The shielding layer 34 has a characteristic with respect to the reading light, which is sufficient to shield light within a visible range. The shielding layer 34 has also a characteristic which is sufficient to transmit. through the shielding layer 34, light within a infrared range, that is, reading light of the optical card 101.

A paint film of black in color is most preferable for the shielding layer 34. The paint film of black in color has its film thickness which is thin relatively. The paint film also has a shielding ability sufficient for visible light and is extremely easy in formation. The shielding layer 34, which is black in color, will be described below in more detail. The following compositions were prepared as paint liquid for formation of the shielding layer 34:

| | |
|---|---|
| Spironblack MH Special N (black-color and acid dyes): (Chuo Gosei Kagaku Kabushiki Kaisha) | 1 weight part |
| Vinyl acetate - acrylic copolymer: | 2 weight parts |
| Methanol: | 2 weight parts |
| Ethanol: | 9 weight parts |
| Methyl Cellosolve: | 9 weight parts |

The paint liquid was coated on the second side 30b of the card substrate 30 by a roll coater, and was dried for five (5) minutes at 100° C. Thus, a paint film having its thickness of about 3 μm was obtained. The shielding layer 34 formed by this paint film had its transmittance which was less than 2% in 400 nm~650 nm, which was about 90% at 830 nm, and which was 84% at 780 nm. Accordingly, it is very difficult to view layers adjacent the shielding layer 34 and, on the other hand, no inconvenience occurs in reading by incidence of light from an infrared semiconductor laser or a high-brightness LED (light emitting diode) upon an optical-data recording section 70 subsequently to be described and arranged on the side of the card substrate 30, which is located adjacent the second side 30b thereof, In this connection, in view of the fact that no inconvenience occurs in reading, it is preferable that dyes are used as coloring agent for the shielding layer 34. However, pulverized pigment may be used as the shielding layer 34. Since, further, the shielding layer 34 of black in color is a single layer, manufacturing of the shielding layer 34 is very advantageous. However, two layers, for example, a red layer and a blue layer may be used for the shielding layer 34. Moreover, in order to obtain the black in color, various coloring agents may be mixed with each other.

The component B including the optical-data recording section 70 will next be described. The component B has its support substrate which is formed by a plastic film 40 having thickness of the order of 10 $\mu$m~50 $\mu$m, for example. The plastic film 40, that is the support substrate, is provided for supporting the optical-data recording section 70, and is made of material which can withstand various treatments on formation of a light-reflective pattern 4 of the optical-data recording section 70. As the plastic film 40, it is preferable that material is high in strength of physical property, superior to smoothness, low in deformation and thermal expansion with respect to heat. and superior to etching resistance ability. The material of the plastic film 40 can be selected from the aforesaid materials used in the card substrate 30. For instance, a thin film of polyethylene terephthalate is preferable for the plastic film 40.

The light-reflective pattern 42 is supported by one of the opposite sides of the plastic film 40 through an absorption layer 43. The adhesive layer 21 mentioned previously is coated on the entire one side of the plastic film 40 including the light-reflective pattern 42. The light-reflective pattern 42 includes pre-format, in addition thereto, contents of recording information. The light-reflective pattern 42 is obtained by the following manner. That is, an optical-data recording section 70 of metal or alloy high in light reflectivity is formed on the absorption layer 43 on the one side of the plastic film 40. Subsequently, the optical-data recording section 70 is selectively etched by the use of the known photo-etching technique. As material of the optical-data recording section 70. that is, the light-reflective pattern 42, Al is generally used. In addition thereto, Cu, Ag, Au, Ni, Co, Fe, Cr, Sn, Te or the like may be used for the material of the light-reflective pattern 42. The light-reflective reflective pattern 42 has its thickness which is very thin such as thickness of the order of 0.1 $\mu$m, for example. In this connection, the absorption layer 48 is a layer which attempts readability by transmission or absorption of the reading light. For instance, the absorption layer 43 can be obtained by the following manner. That is, only transparent binder made of acrylic resin, or paint liquid made of the binder and solvent and dyes absorbing the reading light are coated on the plastic film 40 and are dried.

In connection with the above, the component B can easily be manufactured, as compared with manufacturing of cut sheets. The reason for this is that the plastic film 40, that is the support substrate, is flexible and can be wound up.

Furthermore, the component C is chiefly composed of a rear substrate 30. Various characters or designs are printed on one of the opposite sides of the component C. which is remote from the light-reflective pattern 42 of the optical-data recording section 70. Accordingly, as the rear substrate 50 that is the subject, it is preferable to use resin, for example, coloring resin such as white, which is pleasing in appearance of a printing pattern. Of course, the rear substrate 30 may be used such that colored thin layers are formed on both sides of the card substrate 30 which is made of transparent or semi-transparent resin. As the rear substrate 50, used is a polyester sheet, a polyvinyl chloride sheet or a polycarbonate sheet which has its thickness of the order of 300 $\mu$m~400 $\mu$m.

The rear substrate 50 has the other sides, on which the aforesaid adhesive layer 22 is formed. A magnetic tape 52 is provided on the peripheral portion of the one side of the rear substrate 50.

Second Embodiment

Figure 2:
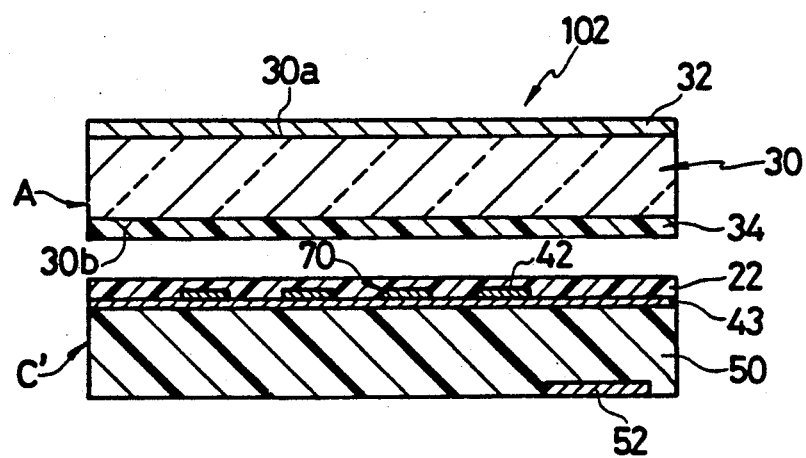
FIG. 2 is a cross-sectional view of an optical card having a two-layer construction, according to a second embodiment of the invention.

Referring to FIG. 2, there is shown an optical card 102 according to a second embodiment of the invention. The optical card 102 is composed of two layers including two components A and C', and has a construction in which the light-reflective pattern 42 of the optical-data recording section 70 and the absorption layer 43 are formed on one of the opposite sides of the rear substrate 50, thereby omitting the intermediate component B of the first embodiment. Although the first and second embodiments are different in layer construction from each other, the optical card 102 has also the shielding layer 34 on the side of the protective or card substrate 30 which has its first side 30a located on the reading side. For this reason, it is possible at the stage of components to inspect or the like the function of the shielding layer 34. In addition, the advantages of the shielding layer 34 are the same as those of the previous first embodiment.

Third Embodiment

Referring to FIG. 3A, there is shown an optical card 103 according to a third embodiment of the invention. The optical card 103 has its single-layer construction having a single component A', and has a construction in which the shielding layer 34 is arranged on the first side 30a of the protective or card substrate 30. The light-reflective pattern 42 of the optical-data recording section 70 is arranged on the second side 30b through an anchor layer 80. Thus, the rear substrate 50 in the first embodiment is further omitted. The shielding layer 34 serves also as the hard-coat layer of the first and second embodiments described above. Alternatively, a hard-coat layer may be provided on a side of the shielding layer 34, which is remote from the card substrate 30. The anchor layer 80 is provided for improving adhesiveness of the light-reflective pattern 42 with respect to the card substrate 30.

It is advantageous in shielding of the light-reflective pattern 42 of the optical-data recording section 70 to locate the shielding layer 34 at a position remote from the light-reflective pattern 42. The reason for this is that the shielding layer 34 is difficult to be influenced by the light-reflective pattern 42, as compared with the aforementioned conventional case where the shielding layer is arranged adjacent the optical-data recording section.

In the optical card 103, a protective layer 60 serving also as an absorption layer is coated on the second side 30b of the card substrate 30 through the anchor layer 80 and the light-reflective pattern 42. The protective layer 60 has a function as the absorption layer, in addition thereto, a function making vision or view difficult. The protective layer 60 may be composed of two layers including an absorption layer and a printing layer, or may be composed of a single layer which includes both dyes absorbing the reading light and pigments shielding a visual range.

As mentioned previously, in the optical card 103, the shielding layer 34 is arranged on the first side 30a of the card substrate 30. Thus, it is possible to inspect or the like the shielding layer 34 on the card substrate 30 prior to formation of the light-reflective pattern 42 of the optical-data recording section 70.

Modification of the Third Embodiment

Referring to FIG. 3B, there is shown a modification of the third embodiment illustrated in FIG. 3A. In the modification, the component C of the first embodiment described with reference to FIG. 1 is additionally provided on the component A' of the third embodiment illustrated in FIG. 3A. That is, the component C including the adhesive layer 22, the rear substrate 50 and the magnetic tape 52 is arranged on the second side 30b of the card substrate 30 through the anchor layer 80 the optical-data recording section 70 and the protective layer 60.

Fourth Embodiment

Figure 4:
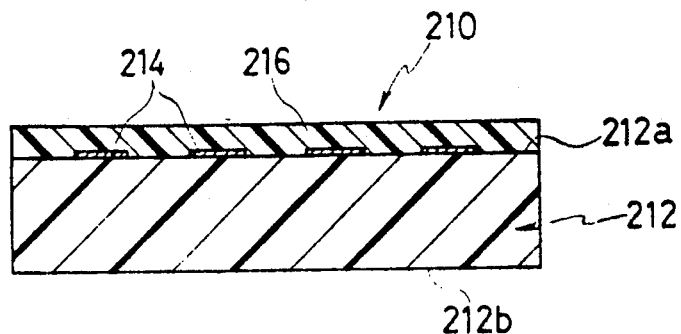
FIG. 4 is a cross-sectional view of an optical card according to a fourth embodiment of the invention.

Referring to FIG. 4, there is shown a read only optical card 210 according to a fourth embodiment of the invention. The optical card 210 has a card substrate 212 which is similar in construction to the card substrate 30 of the first embodiment. The card substrate 212 has a first side 212a and a second side 212b which are parallel to each other and which are smooth in surface roughness. The card substrate 212 can also be made of materials similar to those of which the optical substrate 30 of the first embodiment is made. However, opaque material is preferable for the optical substrate 212. An optical-data recording section 270 including a light-reflective pattern 214 is formed on the first side 212a of the card substrate 212, and various printing patterns (not shown) are formed on the second side 12b of the card substrate 212. A pair of thin film layers may be formed respectively on the first and second sides 212a and 212b of the card substrate 212.

The light-reflective pattern 214 of the optical-data recording section 270 is the same as the light-reflective pattern 42 of the first embodiment. The light-reflective pattern 214 is obtained as follows. That is, the optical-data recording section 270 of metal or alloy high in light reflectivity is formed on the first side 212a of the card substrate 212 and, subsequently, the optical-data recording section 270 is etched by the use of the known photo-etching technique. In this case, the optical-data recording section 270 may be formed on the first side 212a of the card substrate 212 with an anchor-coat layer positioned therebetween.

A shielding layer 216 is coated on the first side 212a of the card substrate 212 which includes the light-reflective pattern 214 of the optical-data recording section 270. The shielding layer 210 has not only a characteristic sufficient to shield light within a visible range, but also a characteristic sufficient to transmit, through the shielding layer 216, infrared light that is the reading light of the light-reflective pattern 214. The shielding layer 216 is provided for shielding the light within a visible range to cover the presence of the light-reflective pattern 214 high in light reflectivity when viewed. The shielding layer 216 may be made of materials which are the same as those of which the shielding layer 34 of the first embodiment is made. Thus, the shielding layer 216 has various functions identical with those of the shielding layer 34 of the first embodiment has.

Various materials can be used as the shielding layer 216, as far as the materials has the functions mentioned above, Particularly, however, it is convenient to select material which has a characteristic as a hard-coat layer. In this connection, it is of course that characters or the like can be printed on the shielding layer 216.

Figure 5:
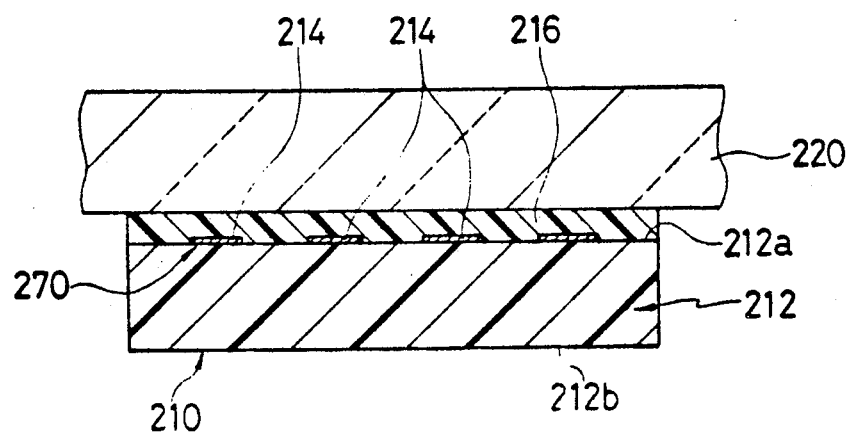
FIG. 5 is a view showing a condition in which the optical card illustrated in FIG. 4 is read.

In case where the optical card 210 constructed as described above is read, the reading is conducted as follows. That is, as shown in FIG. 5, the shielding layer 216 is abutted against a lower surface of an abutting plate 220, a semi-conductor laser is applied to the optical card 210 from the side of he shielding layer 216, and light reflected from the light-reflective pattern 214 is detected by a CCD (charge-coupled device) line sensor positioned above the cutting plate 220. At this time, there are obtained advantages in which no inconvenience occurs in reading, and the shielding layer 216 black in color absorbs noises conversely. That is, noises occur by reflection or the like of an interface of each layer or the abuting plate 220. Particularly, when the entire one side o he optical card 210 is in contact with the abutting plate 220, noises occur by the reflection of the abutting plate 220. However, there are obtained advantages in which the shielding layer 216 attenuates or erases the noises. Moreover, in case of reading by the CCD line sensor, an auto-focus mechanism is omitted for simplification of construction. Accordingly, list is preferable that the shielding layer 216 per se is thinned as far as possible, in order to effectively obtain a focus surface that is standard.

Fifth Embodiment

Figure 6:
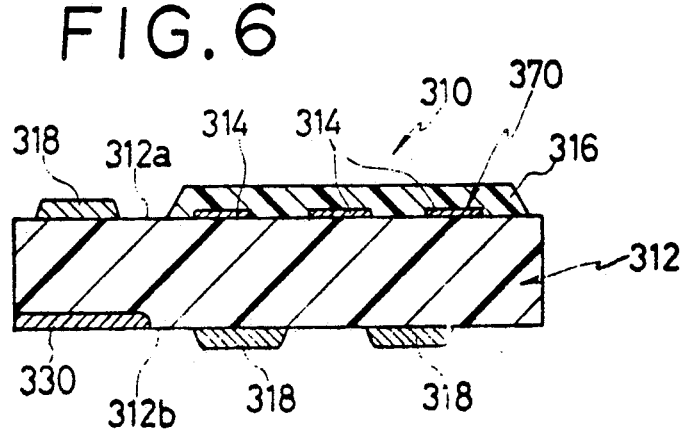
FIG. 6 is a cross-sectional view of an optical card according to a fifth embodiment of the invention.

Referring to FIG. 6, there is shown na optical card 310 according to a fifth embodiment of the invention. The optical card 310 comprises a card substrate 312 having a first side 312a and a second side 312b which are parallel to each other. A shielding layer 316 is partially coated on the first side 312a of the card substrate 312 to cover a light-reflected pattern 314 of an optical-data recording section 370. A plurality of printing patterns 318 are formed on the remaining portion of the first and second sides 312a and 312b of the card substrate 312. Further, a magnetic recording section or a magnetic tape 330, which is composed of a magnetic stripe, is provided on a periphery of the second side 312b of the card substrate 312. In this manner, other recording sections, for example, an OCR (optical character recognition), a bar code, an IC (integrated circuit) memory or the like can be provided on a single optical card, in addition to the light-reflective pattern 314.

In connection above, the invention is particularly effective for a read-only optical card which uses recording materials high in light reflectivity. However, the invention is not limited to such optical card. The invention is also applicable to an optical card of postscript type.

What is claimed is:

1. An optical card comprising:
   a card substrate having a first and a second side which are parallel to each other, said card substrate having its rigidity which is sufficient to handle said card substrate independently, said first side of said card substrate serving as a reading side upon which reading light is incident;
   an optical-data recording section including a light-reflective pattern, said optical-data recording section being arranged on said second side of said card substrate, in which optical data incident upon said optical-data recording section toward said reading side of said card substrate is recorded by said optical-data recording section, the optical data recorded on he optical card being read by detecting the light reflected from the light-reflective pattern; and a shielding layer is arranged on said fist side of said card substrate, for shielding said optical-data recording section from a viewer's field of view, said shielding layer being substantially black in color and having its transmission characteristic with respect to said reading light, which is sufficient to shield light within a visual range and to enable reading of said optical-data recording section whereby a sensor for reading the light reflective patterns adapted to be positioned at the reading side upon which reading light is incident for reading.

2. An optical card according o claim 1, wherein said card substrate is transparent.

3. An optical card according to claim 1, including an additional layer arranged between said optical-data recording section and said card substrate.

4. An optical card according to claim 3, wherein said additional layer is an anchor layer for improving adhesiveness of said optical-data recording section with respect to said card substrate.

5. An optical card according to claim 4, including a protective layer located with said optical-data recording section positioned between said card substrate and said protective layer, said shielding layer serving also as a hard-coat layer, and said protective layer serving as an absorption layer.

6. An optical card according to claim 5, including a rear substrate which is located with said optical-data recording section positioned between said anchor layer and said rear substrate.

7. An optical card according to claim 6, including an adhesive layer located between said protective layer an said rear substrate with said optical-data recording section positioned between said protective layer and said adhesive layer.

8. An optical card according o claim 1, including an information-recording section located o at least one of said first and second sides of said card substrate.

9. An optical card according to claim 1, wherein said reading light is within a infrared range.

* * * * *